United States Patent
Choi

(10) Patent No.: US 8,300,784 B2
(45) Date of Patent: Oct. 30, 2012

(54) METHOD AND APPARATUS FOR SHARING DATA IN VIDEO CONFERENCE SYSTEM

(75) Inventor: Manchul Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 12/797,456

(22) Filed: Jun. 9, 2010

(65) Prior Publication Data
US 2011/0109716 A1    May 12, 2011

(30) Foreign Application Priority Data
Nov. 11, 2009 (KR) .................. 10-2009-0108554

(51) Int. Cl.
*H04M 11/00* (2006.01)

(52) U.S. Cl. ............... 379/93.21; 348/14.03; 348/14.07; 348/14.12

(58) Field of Classification Search ............... 348/14.01, 348/14.03, 14.07, 14.12, 14.13, 14.14, 14.15; 379/88.13, 14.01, 14.03, 14.07, 14.12, 14.13, 379/14.14, 14.15, 93.17, 93.21, 202.01, 158
See application file for complete search history.

(56) References Cited

U.S. PATENT DOCUMENTS

| | | | |
|---|---|---|---|
| 5,915,091 A * | 6/1999 | Ludwig et al. ................. | 709/204 |
| 6,025,871 A * | 2/2000 | Kantor et al. .............. | 348/14.07 |
| 7,925,288 B2 * | 4/2011 | Kim ............................ | 455/518 |
| 2010/0218100 A1 * | 8/2010 | Simon et al. .................. | 715/731 |

* cited by examiner

*Primary Examiner* — Olisa Anwah
(74) *Attorney, Agent, or Firm* — Birch, Stewart, Kolasch & Birch, LLP

(57) ABSTRACT

A method and an apparatus for sharing data in a Video Conference System (VCS) are provided. According to an embodiment, when a user wants to share data with the other party in the VCS, only a user selected region and not the entire screen is converted into a format optimized for the other party's display and then transmitted to the other party.

22 Claims, 13 Drawing Sheets

115

METHOD AND APPARATUS FOR SHARING DATA IN VIDEO CONFERENCE SYSTEM

CROSS-REFERENCE TO RELATED APPLICATIONS

The present application claims priority under 35 U.S.C. 119 and 35 U.S.C. 365 to Korean Patent Application No. 10-2009-0908554 filed on Nov. 11, 2009, which is hereby incorporated by reference in its entirety.

BACKGROUND OF THE INVENTION

The present disclosure relates to a method and an apparatus for sharing data in a Video Conference System (VCS).

A VCS has a function that helps a video conference progress by transmitting contents of a personal computer (PC) in addition to image transmission. The contents transmission is accomplished through receiving a video output signal of a PC in a VCS, scaling the received signal with a size that the VCS can transmit, compressing an image of the scaled screen, and transmitting the compressed image via a network.

Typically, since the resolution of a PC is relatively high, the PC scales down its resolution based on the image compression performance of the VCS. Unlike an image, since the contents include a text in many cases, it is hard to recognize the contents when an image quality is poor due to the scale-down operation. Especially, when the contents are viewed through a VCS function applied to a portable device, it is almost impossible to recognize the texts because the scaled degree of the PC screen is relatively high.

A method for resolving or addressing the above limitations due to the scale-down operations is highly desired.

SUMMARY OF THE INVENTION

Embodiments of the invention provide a method and an apparatus for addressing limitations associated with the related art when the displays of a user and the other party have respectively different resolutions and sizes in video conference terminals.

Embodiments of the invention also provide a method and an apparatus for addressing limitations associated with the related art due to different performances between the devices of different users participating in a video conference, by providing only a portion that the user selects with a format optimized for the other party's display when the user wants to share data with the other party in a video conference system.

Embodiments of the invention also provide a method and an apparatus for reducing the data transmission amount by considering whether data that a user wants to share includes only a text or not.

Embodiments of the invention provide a method and terminal for providing a video conference, which address the limitations and disadvantages associated with the related art.

According to an embodiment, the present invention provides a data sharing method in a VCS, in which a full screen is not transmitted if the user wants to share data with the other party and only a region that the user selects is converted into a format optimized for the other party's display in order to transmit the content in the converted format.

In one embodiment of the invention, a terminal for a video conference system comprises: a display configured to display an image of a user or other party; a user input unit configured to receive the user's input; a region cutting unit configured to detect and capture the user selected region of the image; and a network unit configured to transmit the captured region of the image.

In another embodiment of the invention, a terminal for a video conference system includes: a user input unit configured to receive a user input; a network unit configured to receive an image of a selected region which is selected by other party from an image displayed on the other party's display; and a display configured to display the received image of the selected region.

In further another embodiment of the invention, a method of transmitting data in a video conference system, comprises: detecting a user's selection on a region of an image displayed on a display of the user's terminal; capturing an image of the selected region; and transmitting the captured image to other party's terminal.

In still further another embodiment of the invention, a method of receiving data in a video conference system, comprises: receiving an image of a selected region which is selected by other party from an image displayed on the other party's display; and displaying the received image of the selected region.

According to an embodiment, the invention provides a first terminal for providing a video conference in cooperation with a second terminal, the first terminal comprising: a display configured to display a plurality of windows including first and second windows, the first window configured to display an image of at least one user at the second terminal, the second window configured to display a content of the first terminal associated with the video conference; a user input unit configured to receive a user's selection of a portion of the content displayed on the second window; a region selecting unit configured to extract the selected portion of the content displayed on the second window; and a network unit configured to transmit the extracted portion of the content to the second terminal.

According to another embodiment, the invention provides a method for providing a video conference in cooperation with a second terminal, the method comprising: displaying, by a display of a first terminal, a plurality of windows including first and second windows, the first window configured to display an image of at least one user at the second terminal, the second window configured to display a content of the first terminal associated with the video conference; receiving, by the first terminal, a user's selection of a portion of the content displayed on the second window; extracting, by a region selecting unit of the first terminal, the selected portion of the content displayed on the second window; and transmitting, by the first terminal, the extracted portion of the content to the second terminal.

The details of one or more embodiments according to the invention are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a flowchart illustrating a data transmitting method of a selected region in a VCS according to one embodiment of the invention.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention will be described in more detail with reference to the drawings.

Figure 1:
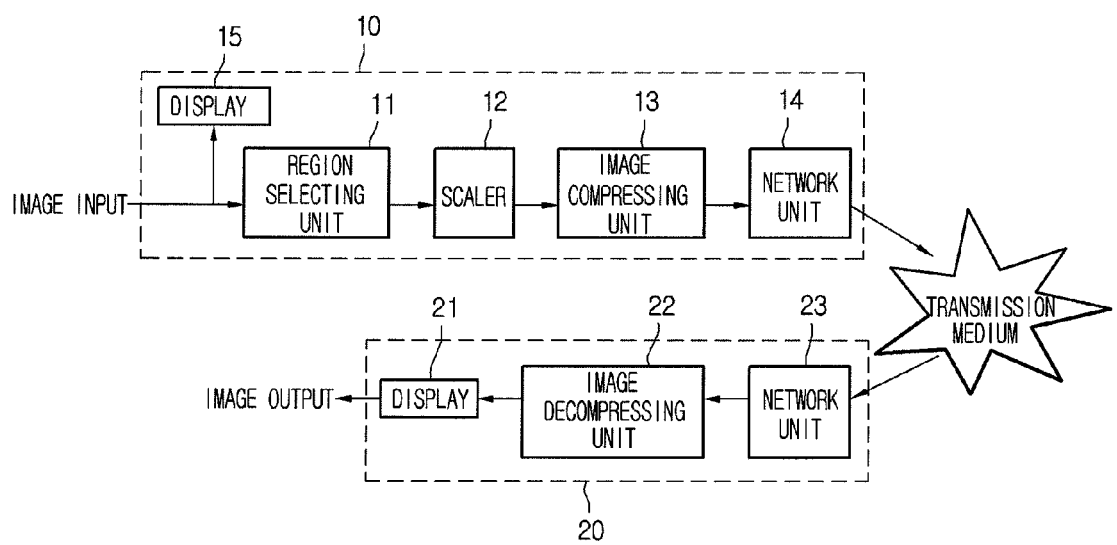
FIG. 1 is a configuration of a video conference system (VCS) according to one embodiment of the invention.

FIG. 1 is a configuration of a video conference system (VCS) according to one embodiment of the invention. All the components of the video conference system are operatively coupled and configured.

Referring to FIG. 1, a user terminal 10 at a transmitting side and the other party terminal 20 at a reception side exchange data with each other through a transmission medium such as the Internet, private communication networks, or other network(s). The terminals 10 and 20 can be computers, tablets, TVs, mobile terminals, handsets, smart phones, multimedia devices, etc. The terminals 10 and 20 can be the device of same type or different type.

The user terminal 10 includes a display 15, a region selecting unit 11, a scaler 12, an image compressing unit 13, and a network unit 14. The display 15 displays a video conference image to a user at the user terminal 10. The region selecting unit 11 cuts a selected region from an image displayed on a screen of the display 15 and temporarily stores the selected region's image as an additional image in a memory. The memory can be any storage unit in the terminal 10 or associated with the terminal 10. The scaler 12 modifies the resolution and size of the selected region's image to fit into the other party terminal's display to produce a scaled image. The image compressing unit 13 compresses the scaled image. The network unit 14 transmits the compressed image and receives predetermined data from the other party terminal 20 via a transmission medium which can be a communication network, a short range or near field network like Bluetooth, etc.

The other party terminal 20 includes a network unit 23 for receiving an image from the user terminal 10, an image decompressing unit 22 for decompressing the received image and processing the image, and a display 21 for displaying a video conference image based on the processed image. Further, the other party terminal 20 may include a display unit for the video conference. Each of the terminals 10 and 20 may further include a camera for capturing images to be transmitted to each other. That is, any operations (e.g., image capturing, image transmission, image reception, region selection, scaling, etc.) performed in the user terminal 10 can be carried out in the other party terminal 20 and vice versa, for video conference or other use.

The video conference system of FIG. 1 is used for transmitting a video conference image from the user terminal 10 to the other party terminal 20. Since more than two users may exchange images substantially in a video conference, the user terminal 10 includes a configuration unit for receiving a conference image, and the other party terminal 20 includes a configuration unit for transmitting an image. In addition, the user terminal 10 and the other party terminal 20 for performing a transmission and reception of video conference images may have the same configuration.

Furthermore, component functions of the user terminal and the other party terminal 20 may be performed by one exclusive processor chip or a general processor, and the user terminal 10 and the other party terminal 20 may further include a memory or other storage unit for a processor operation or other operations.

Figure 2:
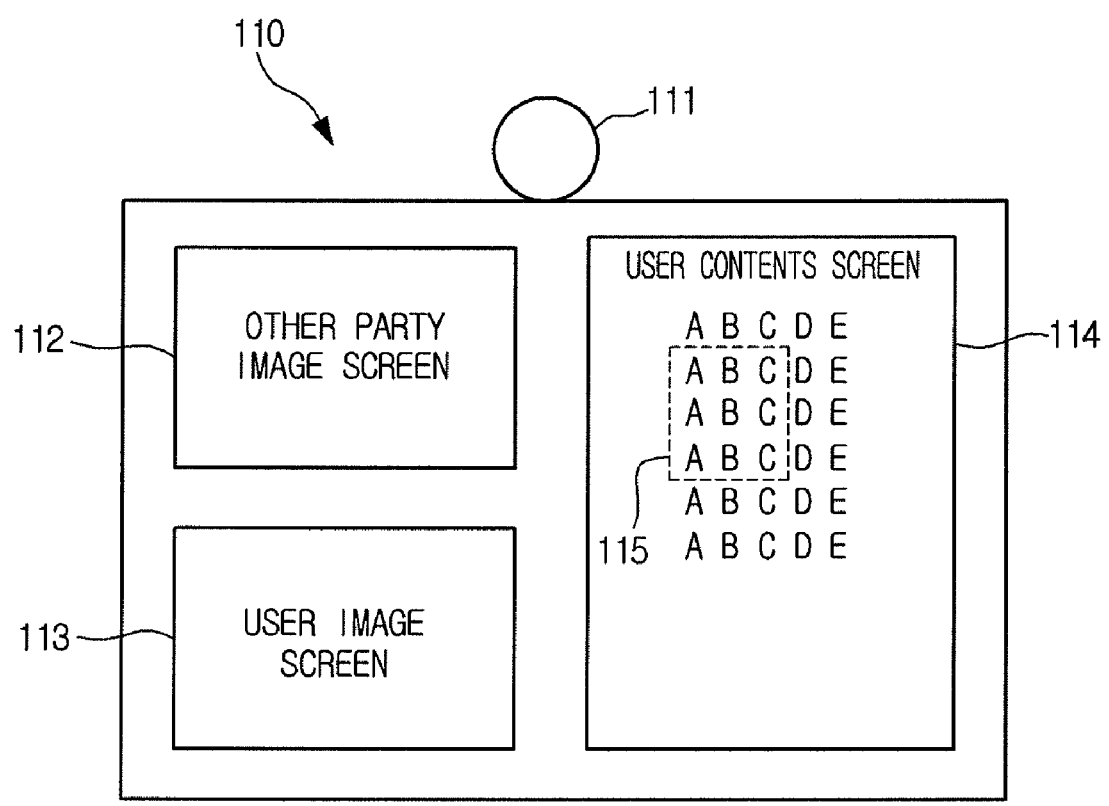
FIGS. 2 to 5 are illustrating a method of transmitting a portion of a user display being displayed on a display of a user terminal according to one embodiment of the invention.

FIG. 2 illustrates an example of a user screen 110 of the display 15 of the user terminal 10 in the VCS according to one embodiment of the invention. A camera 111 may be equipped at one side of the screen 110 to capture an image of a user. For instance, the user terminal 10 may include the camera therein or a separate camera (detachable) may be used. The camera 111 may be installed at any place where an image of a user or any other desired object can be captured.

The user screen 110 may include a plurality of windows for representing the user side information or the other party's information. In more detail, the user screen 110 may include an other party image screen/window 112 for displaying the other party's image, a user image screen/window 113 for displaying a user side image, and a user contents screen/window 114 for displaying contents at the user side. For instance, the other party image screen 112 may display an image of a user or any desired object at the other party terminal 20 (e.g., images captured by the camera at the terminal 20), which is sent from the terminal 20 to the user terminal 10. The user image screen 113 displays images captured by the camera 111 at the terminal 10. The contents screen 114 is a window for sharing multimedia data such as documents, texts, videos, files, etc. with the other party at the other party terminal 20. The user contents screen 114 can be a screen for displaying multimedia data to be transmitted to the other party at the terminal 20 in addition to the image at the user side being transmitted, and thus may display documents of various formats such as a word processor, a power point, PDF files and also display videos (e.g., moving images, still pictures, etc.). The user plays the contents in a PC or database connected to the user terminal 10 and displays them, and transmits the displayed images on the user contents screen 114 to the other party terminal 20.

According to an embodiment, an additional window (other party contents screen) may be provided on the screen 110 of the terminal 10, which displays contents (e.g., documents, PDF files, etc.) from the other party.

Further, although in the above example the user performs the video conference with one party, it is possible that the user performs the video conference with multiple parties. In that case, the screen 110 may include the above-mentioned multiple windows (112, 113 and 114, etc.) for each of the parties.

As a variation, the user at the user terminal 10 may select one or more of the other party image screen 112, the user image screen 113, and the user contents screen 114 to be included on the user screen 110. For instance, the user may configure the manner in which the screen 110 may be displayed according to the user's preference. In this case, only the selected screen is displayed on the user screen 110. For example, a user may set up to display only the other party image screen 112 or only the other party image screen 112 and the other party contents screen (e.g., 124 in FIG. 9).

According to the related art, if an image displayed on the user contents screen is transmitted to the other party terminal as it is using the conventional techniques, since the optimal resolution and image size of the display of the other party terminal are different from those of the display of the user terminal, the image may not be displayed on the other party terminal as displayed on the user contents screen and the viewing problems occur. Especially, if the display of the user terminal has a higher specification, even if an image displayed on the user contents screen is transmitted, it is not properly displayed on the display of the other party terminal. In addition, if the entire contents screen is transmitted, resource is wasted because an unnecessary portion is also transmitted.

Figure 3:
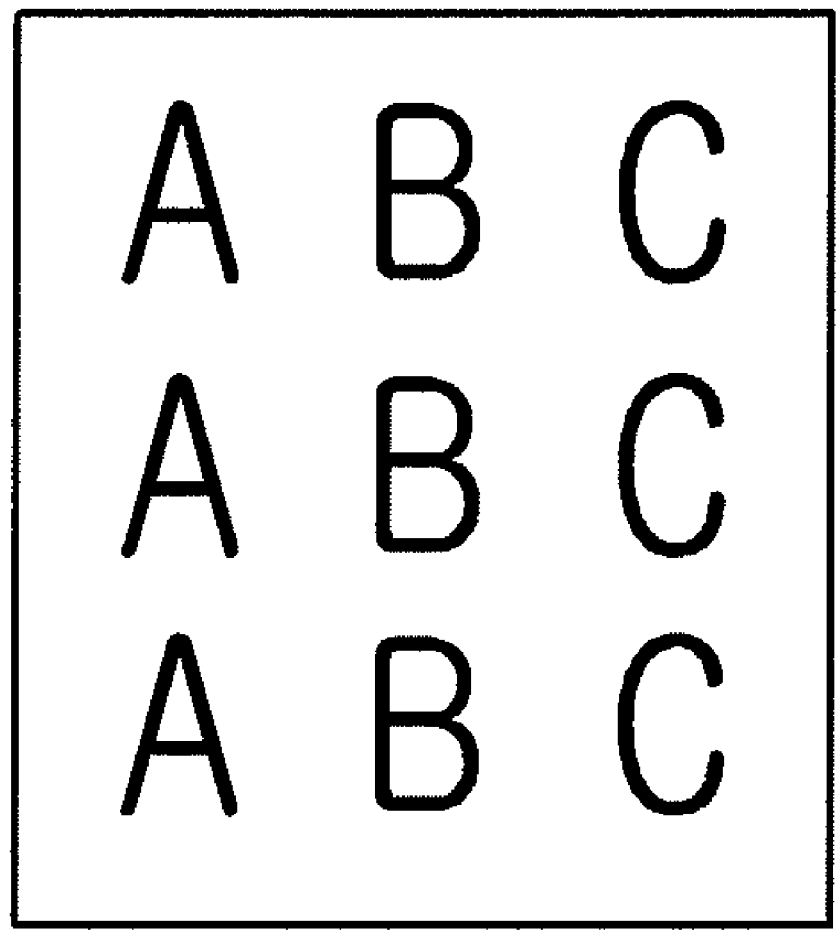

The invention addresses these limitations of the relate art. According to the present invention, a user at the user terminal 10 selects a region to be transmitted from the user contents screen 114. In FIG. 2, if a partial region 115 is selected with letters/texts from the contents screen 114, only the selected partial region 115 is transmitted to the other party terminal 20. That is, an image as shown in FIG. 3 is selected and cut from the images currently displayed on the contents screen 114 and then copied, and the copy of the cut image is then transmitted to the other party terminal 20 for storage and/or display therein. The images displayed on the contents screen 114 may be continuously displayed regardless of this operation. If a user knows that the specification of the display 21 of the other party terminal 20 is lower than that of the display 15 of the user terminal 10, a portion of the image that the user wants to transmit to the other party is selected and then is transmitted.

An image of the selected region 115 is scaled, by the scaler 12, to fit for the resolution and image size of the other party display 15, is compressed by the image compressing unit 13, and then is transmitted to the other party terminal 20 using the network unit 14. In this regard, information on the other party's display 21 (e.g., information about the resolution and image size optimized for the other party's display 21) may be sent from the other party terminal 20 as a portion of the system information provided before the video conference begins.

According to an embodiment, when the information on the other party's display 21 is received from the other party terminal 20, it may be displayed on the user screen 110 of the user terminal 10. Whether the other party's display information is displayed or not may be chosen by the user of the terminal 10.

Figure 4:
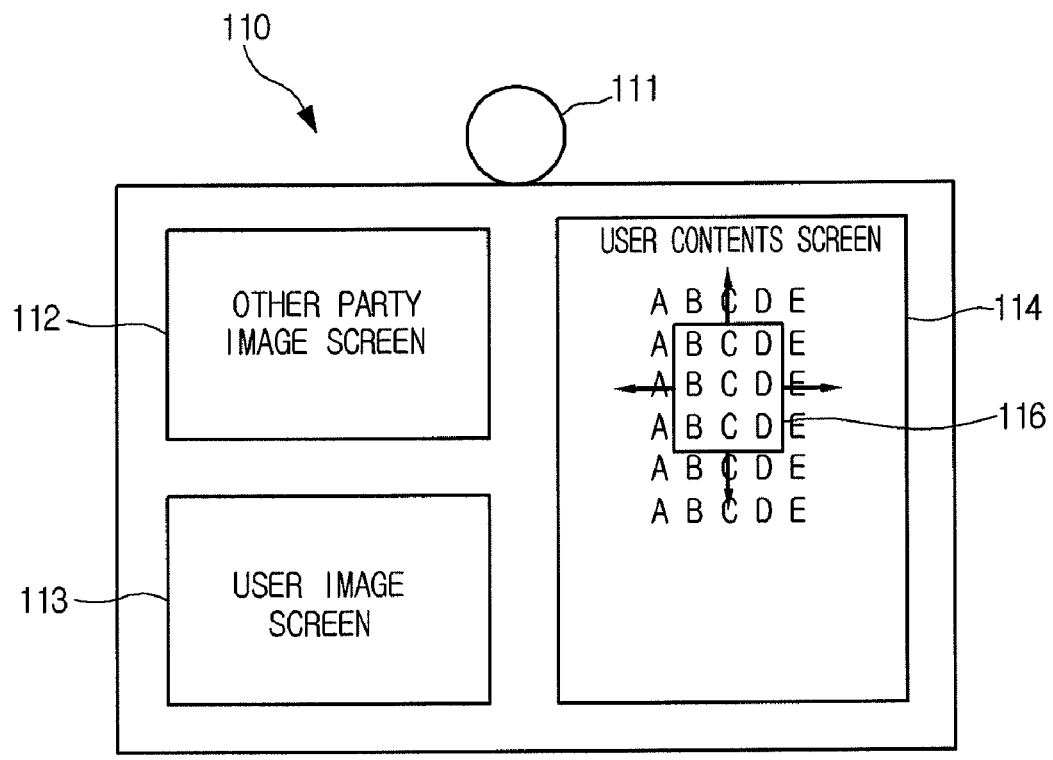

According to an embodiment, as shown in FIG. 4, the user contents screen 114 displays an indicator 116 for displaying the size of the selected region optimized for the other party's display 21. The indicator 116 can be displayed in many different ways, e.g., when the user selects a designated indicator button/key, when the user double-clicks over the user contents screen 114, etc. The user of the terminal 10 can move the indicator 116 to position the portion that the user wants to transmit to the other party. For instance, the user of the terminal 10 can increase or decrease the size of the indicator 116 and/or can move in any direction the indicator 116 on the screen 114, to select any desired portion of the displayed image. This can be done using the input unit of the terminal 10, e.g., a mouse, remote controller, control panel/console, keyboard, soft keys, etc. Once the positioning of the indicator 116 has been completed, the user select the contents belonging to the appropriately positioned/sized indicator 116, e.g., by clicking/selecting over the indicator 116, etc. This selected portion (including the contents displayed therein) of the user contents screen 114 is designated as a user selected region. Then, the user selected region can go through scaling and/or image compression and any other processor for the other party terminal 20 and then the processed user selected region is transmitted to the other party terminal 20 which is then displayed at the display 21, e.g., via the network unit 14 or other means. The indicator 116 may be set to be invisible based on a user's selection/command.

According to an embodiment, if the indicator 116 is used to select the region to be transmitted with the resolution and image size optimized for the other party's display 21, a scaling down process of the scaler 12 may be omitted.

As a result, according to the invention, a user at the other party terminal 20 can view the portion of the image selected by the user at the terminal 10 for the video conference. This operation can be useful in many ways for the video conference. For instance, during the video conference, the user at the terminal 10 can send only the appropriate portion of the entire image/content currently displayed at the user's display 15 to the other party for a more focused discussion and attention. It further reduces the amount of data transmission time during the video conference, which in turn reduces the amount of wait time and video conference time. Further, the user at the terminal 10 can control what information may be viewed by the other party.

Figure 5:
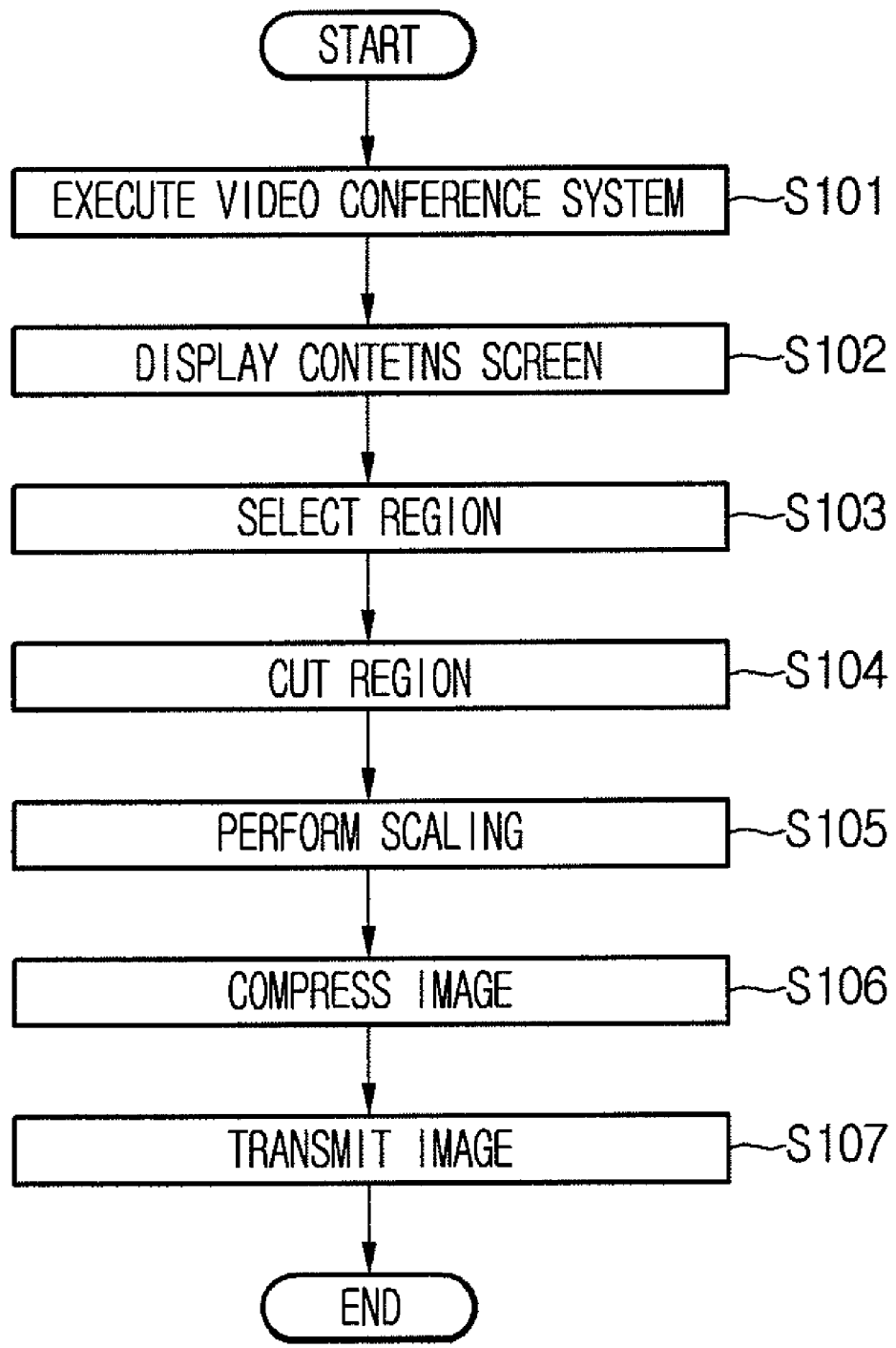

FIG. 5 is a flowchart illustrating a data transmitting method of a selected region of a screen in a VCS according to one embodiment of the invention. The method of FIG. 5 and any other methods of the invention discussed in this document can be implemented in the VCS of FIG. 1, 6 or 11 or any other VCS of the invention discussed in this document.

Referring to FIG. 5, once a VCS is started in operation S101, a contents screen (e.g., user contents screen 114) is displayed on a user display (e.g., 15) of the user terminal to share documents or multimedia data such as videos with the other party in operation S102. If the user at the user terminal selects a region of the contents screen in operation S103, the selected region is cut and copied and the copy of the selected region is stored in a memory of the user terminal as an additional image in operation S104. The cut image/region is scaled down in operation S105, and is compressed in operation S106, and then is transmitted to the other party terminal (e.g., 20) for any processing such as displaying, editing, storage, reproduction, transmission, recording, etc. in operation S107. According to an embodiment, if the region that the user selects has a size optimized for the other party's display (e.g., 21), the scaling at the user terminal may be omitted.

According to one embodiment, the image of the selected region that the user at the user terminal wants to transmit may be displayed at the user terminal (e.g., for verification by the user at the user terminal) before transmission to the other party.

Figure 6:
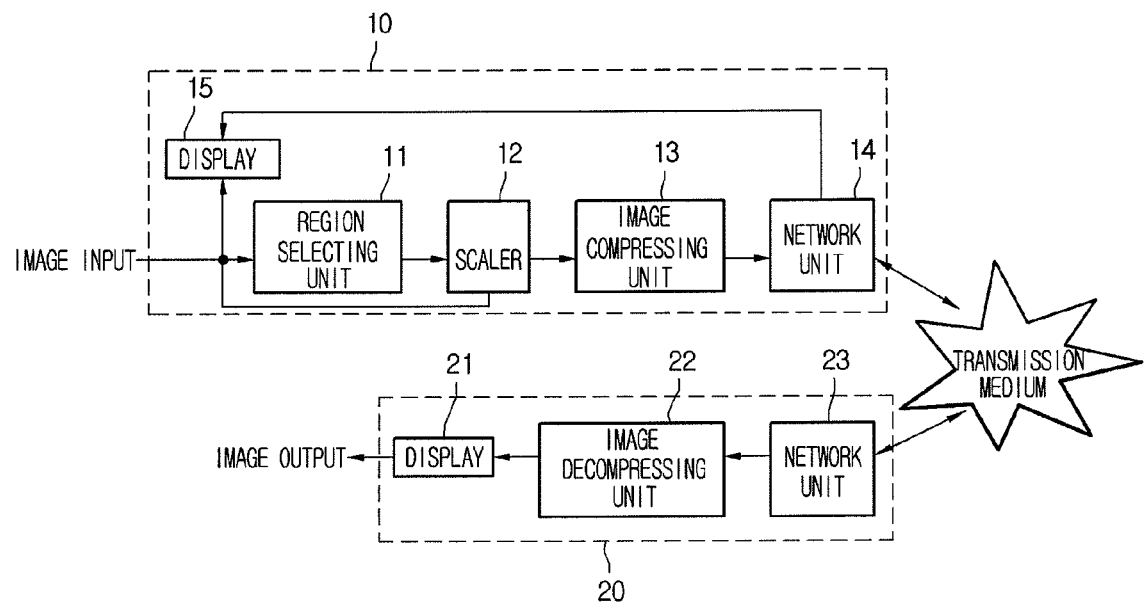
FIG. 6 is a terminal configuration for displaying an image of a region that a user selects on the user terminal 10 according to one embodiment of the invention.

FIG. 6 is a terminal configuration for displaying an image of a region of a screen/window that the user selects on the user terminal 10 according to one embodiment of the invention.

This embodiment is generally the same as that of FIG. 1, except that an output of the scaler 12 (feedback) and an image input are transmitted to the display 15 and displayed thereon. All the components of the VCS of FIG. 6 are operatively coupled and configured.

Figure 7:
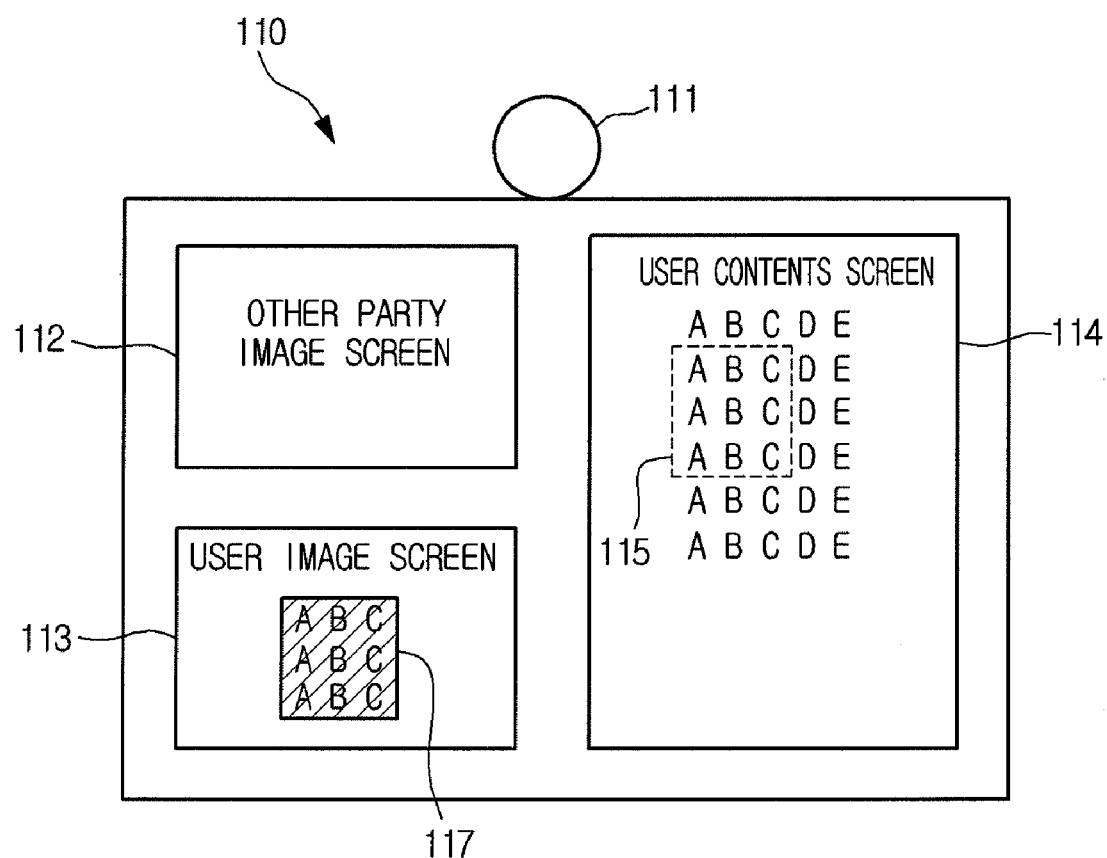
FIGS. 7 to 9 are illustrating a method of providing a feedback of an image, which will be transmitted to the other party, to a user according to one embodiment of the invention.

According to the above configuration, as shown in FIG. 7, when a user (e.g., user at the terminal 10) selects a region 115, the selected region's image 117 may be displayed in a popup window on one of the user screens (e.g., the user image screen 113) of the display 15. By doing this way, the user may receive a feedback about whether or not an image to be transmitted is properly selected.

According to one embodiment, after transmitting the image of the user selected region 117, information about a state of being displayed on the other party's display 21 is received again from the other party terminal 20 and then is displayed on the user side screen. For instance, because an image being displayed on the other party's display 21 is displayed on the user display 15, a feedback about whether or not the image of the user selected region is properly displayed on the other party's display 21 as intended can be provided.

The other party terminal 20 receives the image of the user selected region 17 and then displays it on the display 21. The information about the state of being displayed on the other party display for the user selected region's image 17 may be a captured image of the above displayed screen at the display 21.

Figure 8:
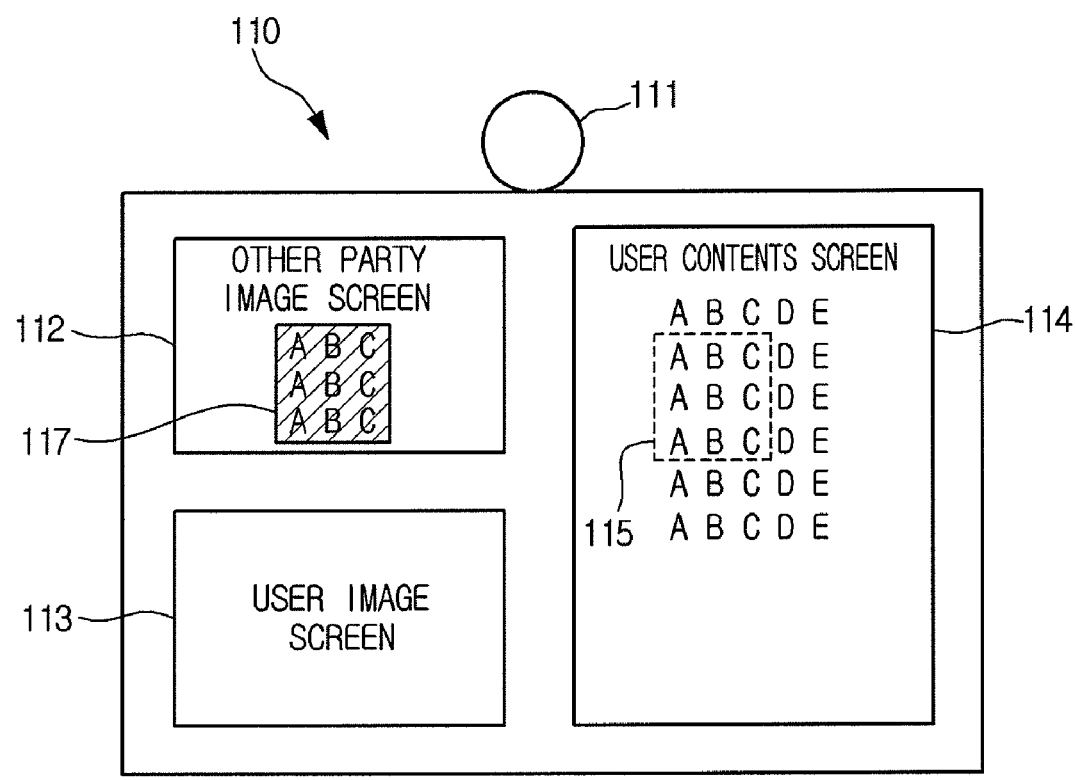
Figure 9:
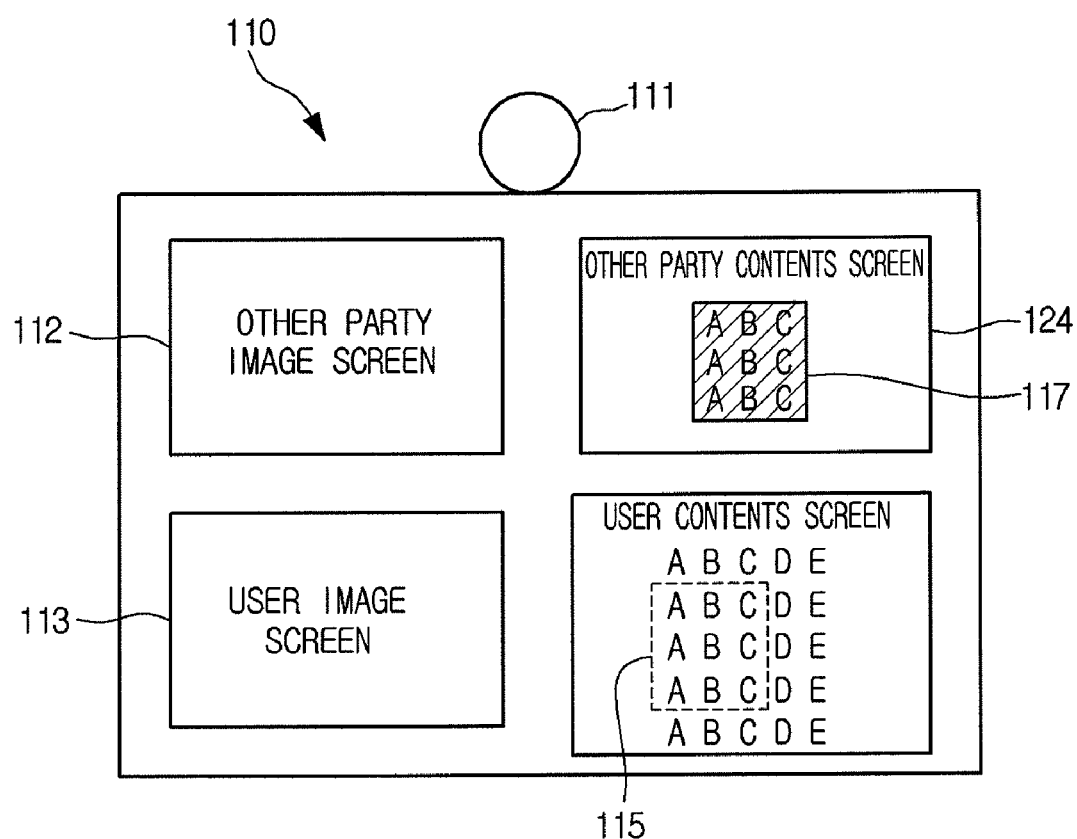

The feedback information received from the other party terminal 20 (i.e., information about the image being displayed on the other party's display 21) may be displayed in a popup window (117) on the other party image screen 112 of the user terminal 10 as shown in FIG. 8. As a variation, when the user display 15 displays the other party contents screen 124 (i.e., a screen for displaying the contents being displayed at the display 21) separately as shown in FIG. 9, the feedback information may be displayed in a popup window (117) on the other party contents window 124.

Figure 10:
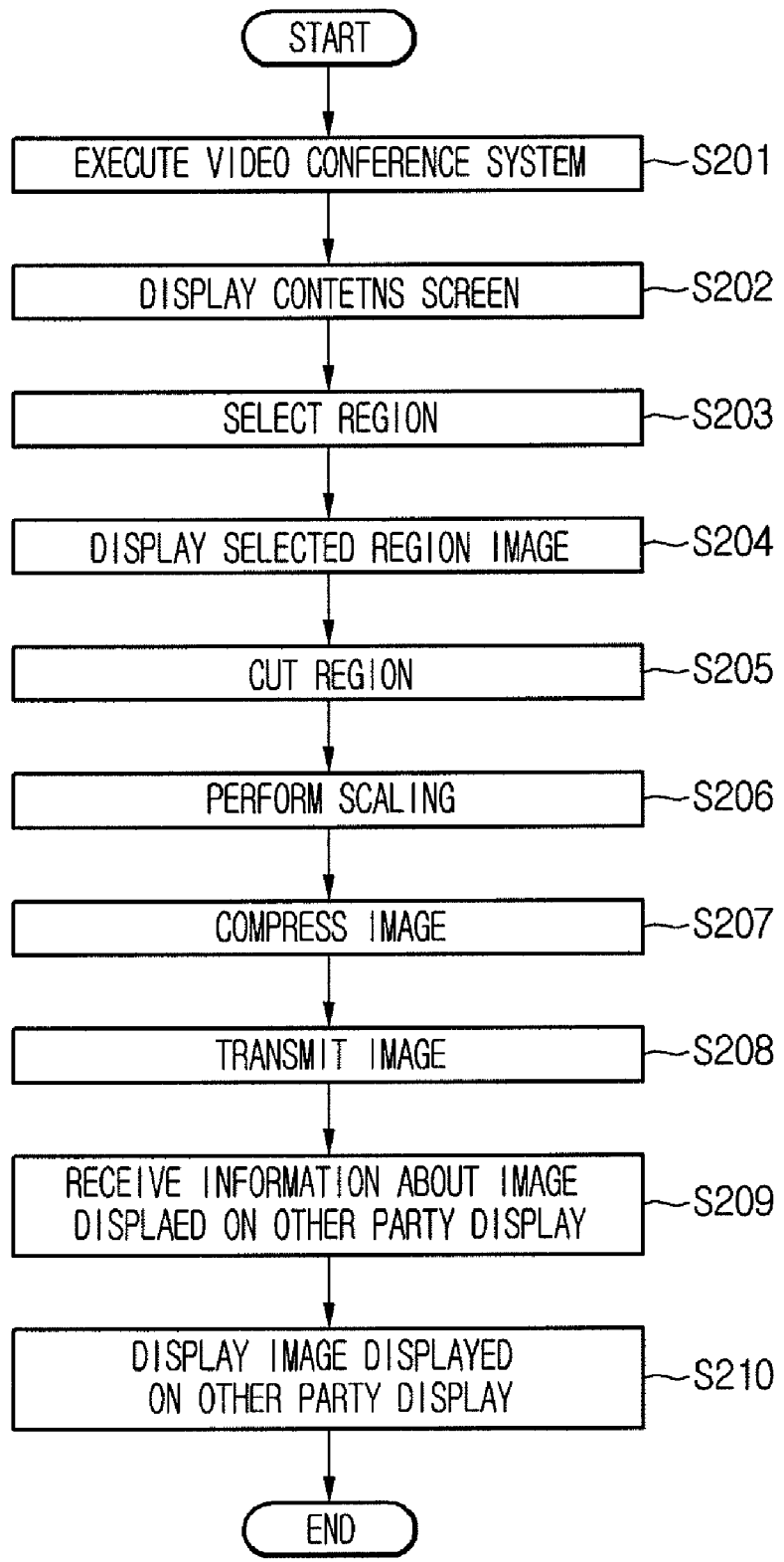
FIG. 10 is a flowchart illustrating a method of providing feedback information to a user before or after an image of a user selected area is transmitted to the other party according to one embodiment of the invention.

FIG. 10 is a flowchart illustrating a method of providing feedback information about whether an image that a user transmits is properly selected before transmitting an image of a user selected region to the other party and whether the image is properly displayed on the other party's display after the transmitting of the image, according to an embodiment of the invention. The method of FIG. 10 can be implemented in the VCS of FIG. 6.

Referring to FIG. 6, once the VCS is initiated in operation S201, a screen for video conference including the contents screen (e.g., 114) is displayed on a user terminal (e.g., 10) in operation S202. In operation S203, when the user selects a predetermined region from the contents screen, the user selected region is displayed in a popup window of the user display (e.g., 15) in operation S204. Once the user confirms the image of the user selected region and determines its transmission, the user selected region is cut and copied and then the copy is additionally stored in a memory of the user terminal in operation S205. The user selected region is scaled down to fit for the other party's display in operation S206 and is compressed in operation S207. Then, the compressed image is transmitted to the other party terminal (e.g., 20) in operation S208. An image that the other party terminal 20 receives from the user terminal 10 is displayed on the user terminal's display 15 and then the captured display image is transmitted to the user terminal again in operation S209 as shown in FIGS. 7-9. Then, the received feedback image is displayed on the display 15 in operation S210 as shown in FIGS. 8-9. The user confirms the feedback image and, if there is a problem, the same image may be re-transmitted or an image with a different size may be transmitted from the user terminal 10 to the other party terminal 20.

According to one embodiment, if an image that the user wants to transmit to the other party during a video conference mainly includes a text, only the text is extracted and then transmitted. Accordingly, the text has a data transmission amount that is significantly smaller than a picture or video, and thus a resource consumed by the data transmission for the video conference can be greatly reduced.

Figure 11:
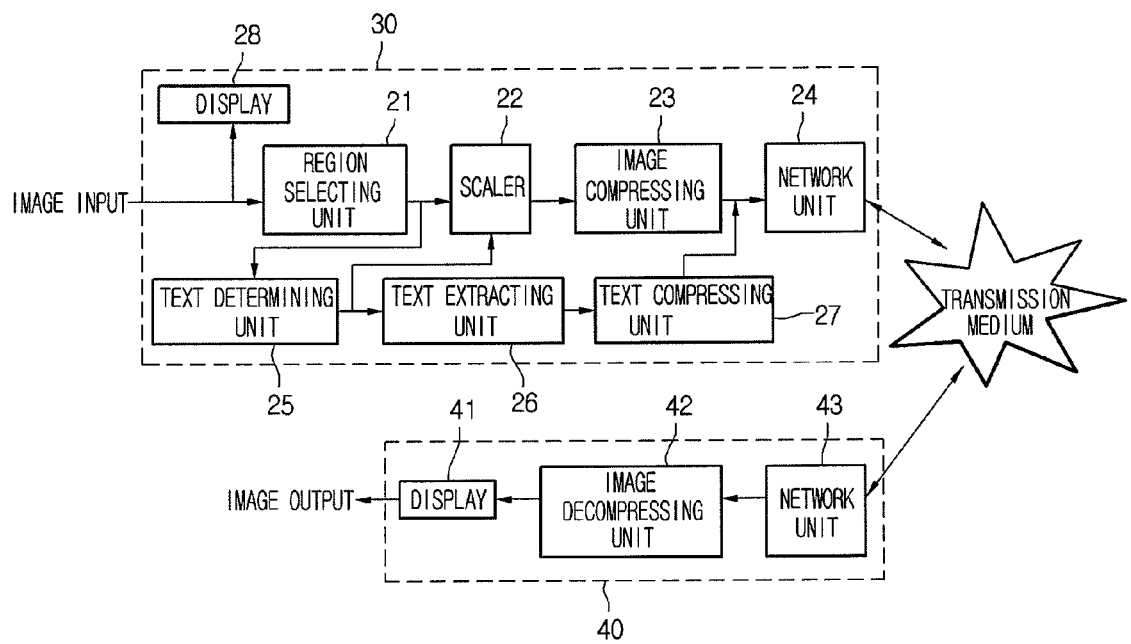
FIG. 11 is a configuration of a VCS for transmitting only a text based on a user's selection if an image of a user selected region includes a text according to one embodiment of the invention.

FIG. 11 is a configuration of a VCS for transmitting only a text based on a user's selection if an image of a user selected region includes a text according to one embodiment of the invention. The VCS of FIG. 11 is similar to that of FIGS. 1 and 6 but may further include units for processing texts separately. All components of the VCS of FIG. 11 are operatively coupled and configured.

Figure 12:
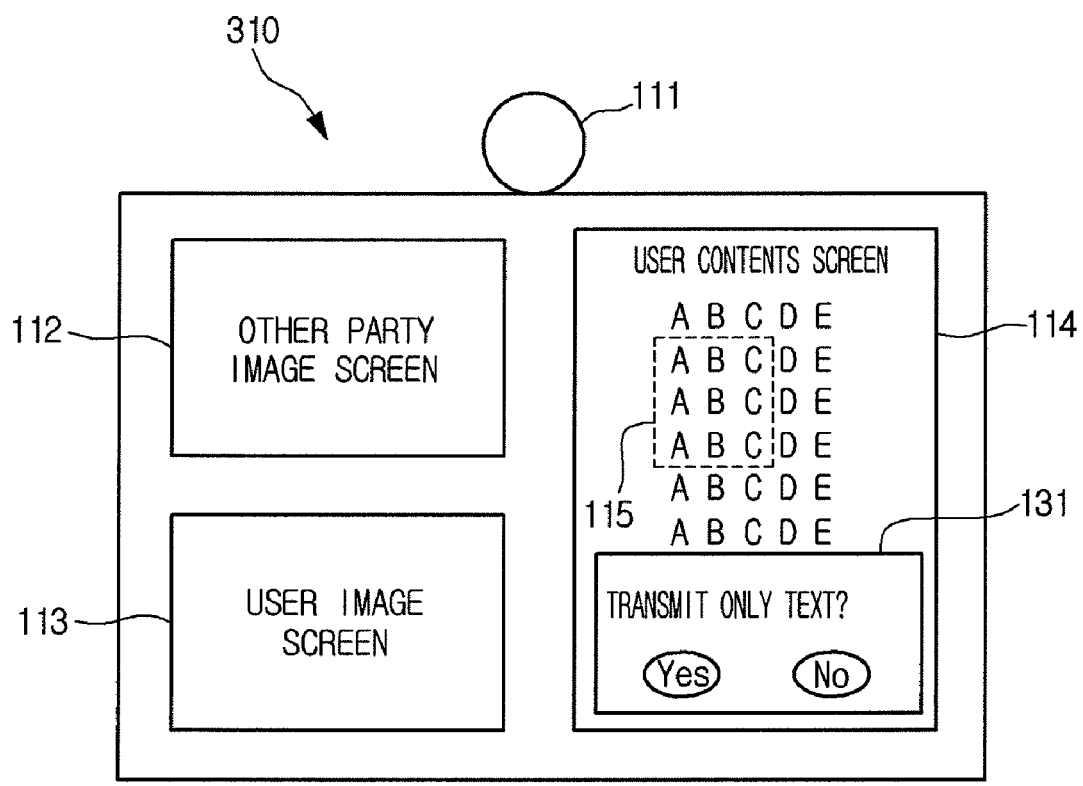
FIG. 12 illustrates a user screen for confirming whether only a text or an image is transmitted to a user when there is a text in a user selected region in the contents screen according to one embodiment of the invention.

As shown in FIGS. 11 and 12, a user terminal 30 includes a display 28, a region cutting unit 21, a text determining unit 25, a text extracting unit 26, and a text compressing unit 27. The display 28 displays images (such as the other party's image and/or contents, the user's contents and/or image, etc.) to a user at the user terminal 30. The region selecting unit 21 cuts a region that the user selects from the user contents screen 114 among the screens/windows 112, 113, 114, etc. displayed on a screen 310 of the display 28, copies it and then stores the copy of the cut region in a memory of the user terminal 30 as an additional image temporarily. The text determining unit 25 determines whether or not a text is included in the user selected region. The text extracting unit 26 extracts the text from the user selected region after the user determines to transmit only the text to the other party if it is determined that the text exists in the user selected region. The text compressing unit 27 compresses the extracted text or converts the extracted text into a format for transmission. Additionally, if the user determines to transmit an image (i.e., not just the text only, but the entire contents which may include pictures, texts, etc.) even when there is a text included in the user selected region or there is no text in the user selected region, the user terminal 30 includes a scaler 22 for scaling the selected image with the resolution and image size optimized for the other party's display 41, an image compressing unit 23 for compressing the scaled image and converting it into a format for transmission, and a network unit 24 for transmitting an image or a text.

The other party terminal 30 includes a network unit 43 for receiving an image and/or a text, an image and text decompressing unit 42 for processing the image and/or text as an outputable format, and a display 41 for outputting the processed image and/or text. As shown in FIG. 1 or 6, FIG. 11 is a configuration for transmitting an image of a region that a user selects from the user terminal 30 to the other party terminal 40 according to an embodiment of the invention. However, the user terminal 30 and the other party terminal 40 mutually transmit and receive data, and thus their configuration may be the same. In addition, functions of the above components may be performed by one exclusive processor or a general processor/controller. That is, each terminal in FIGS. 1, 6 and 11 includes a processor/controller which controls the operations of all components of the terminal.

FIG. 12 illustrates an example of the user screen 310 of the display 28 for confirming whether only a text or an image is transmitted to the other party when there is a text in the user selected region at the contents screen 114. As shown in FIG. 12, if the text determining unit 25 determines that there is a text in the user selected region 115 that the user selects for transmission, a message 131 which asks the user whether an image or only a text of the user selected region 115 is to be transmitted is shown to the user. If the user at the user terminal 30 selects YES (e.g., transmit only the text), then only the text is extracted from the user selected region 115 and then the extracted text only is transmitted to the other party terminal 40 for various processing such as displaying, reproducing, editing, recording, etc. The other party terminal 40 that receives the text can display the text on the display 41 with an appropriate format during or before the video conference. On the other hand, if the user at the user terminal 30 selects NO (e.g., transmit the entire contents of the user selected region), then the image (i.e., the entire image of the user selected region) is selected, processed, and transmitted to the other party terminal 40 according to the methods of FIGS. 1 and 6 using the components 22-24.

According to the above configuration, when an image that the user wants to transmit from the user terminal to the other party terminal during a video conference includes only the text, the amount of data being transmitted or the transmission time duration can be greatly reduced.

Figure 13:
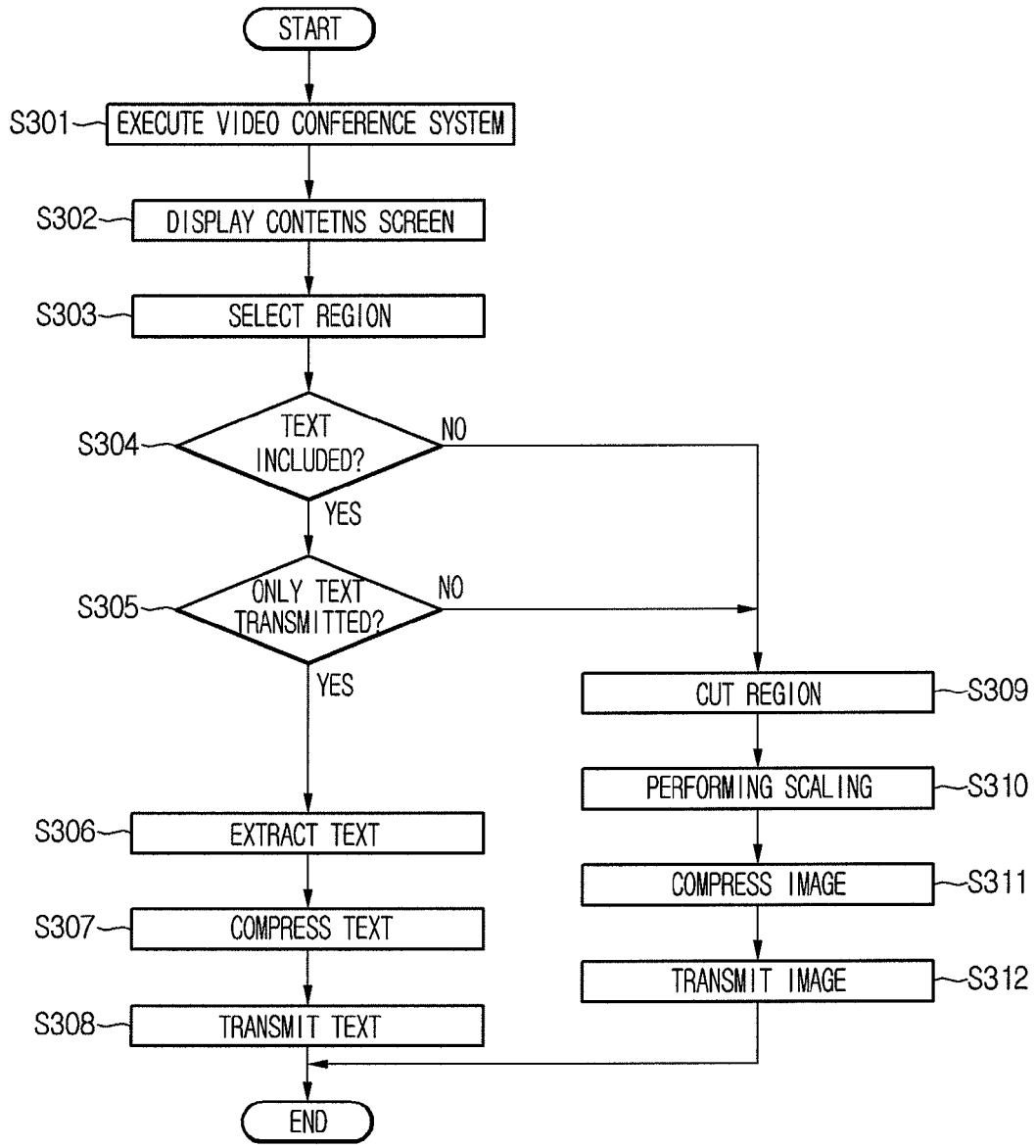
FIG. 13 is a flowchart illustrating a method of extracting and transmitting only a text when there is a text in a user selected region of an image displayed on the contents screen according to one embodiment of the invention.

FIG. 13 is a flowchart illustrating a method of extracting and transmitting only a text when there is a text in a user selected region of an image displayed on the user contents screen according to one embodiment of the invention. The method FIG. 13 can be implemented in the VCS of FIG. 11.

Referring to FIG. 13, a VCS is started in operation S301, various screens 112, 113, 114 (and possibly the other party contents screen like 124) are displayed on a user screen (e.g., 310) in operation S302. If the user at the user terminal 30 selects a region on the user contents screen 114 to share with the other party in operation S303, the text determining unit 25 determines whether the selected region includes a text or not in operation S304. If the text exists in the user selected region, it is confirmed whether only the text is to be transmitted or not by displaying a message (e.g., 131) to the user in operation S305. If the user at the user terminal 30 selects to transmit only the text, then only the text is extracted from the user selected region in operation S306, is compressed and/or converted into a format optimized for transmission in operation S307, and is then transmitted to the other party terminal 40 in operation S308.

If the text determining unit 25 determines that there is no text in the user selected region in operation S304 or if the user selects to transmit the entire image of the user selected region in operation S305, the entire user selected region is cut and stored in the user terminal 30 as an additional image in operation S309. Then, the stored additional image is scaled down with the resolution and size optimized for the other party's display 41 in operation S310. Next, the scaled image is compressed into a format appropriate for transmission in operation S311 and is then transmitted to the other party terminal 40 in operation S312 for displaying, recording, storage, reproduction, editing, sharing, etc.

In the VCS of FIGS. 1, 6 and 11, the directional arrows between the components are merely an example and all components of the VCS can provide bi-directional communication with each other as needed. Further, a controller can control the operations of these components in each terminal. Further, features of one embodiment are applicable to other embodiment(s). For instance, the indicator 116 shown in FIG. 1 is equally applicable to the VCS of FIGS. 6 and 11.

According to the embodiments of the present invention, when a user wants to share data with one or more parties for or during a video conference with each other, only a portion of the data that the user selects is provided with a format optimized for the display(s) of the other parties, such that performance differences between the devices of all members participating in the video conference can be compensated or minimized.

In addition, according to the present invention, the amount of data being transmitted or the data transmission time can be reduced by considering whether data that a user wants to share includes only a text or not.

Although the embodiments of the invention have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A first terminal for providing a video communication in cooperation with a second terminal, the first terminal comprising:
a display configured to display a plurality of windows including first and second windows, the first window configured to display an image of at least one user at the second terminal, the second window configured to display a content and an indicator for selecting content of the first terminal associated with the video communication;
a user input unit configured to receive a user's selection of a portion of the content displayed on the second window;
a region selecting unit configured to extract the selected portion of the content displayed on the second window;
a network unit configured to transmit the extracted portion of the content to the second terminal; and
a scalar unit configured to scale the capture region of the image according resolution information or display size information of the second terminal's display.

2. The first terminal of claim 1, wherein the content displayed on the second window is an image or text.

3. The first terminal of claim 1, wherein when the content displayed on the second window includes texts, the display unit is further configured to display a pop-up window requesting whether or not the texts alone are to be transmitted to the second terminal.

4. The first terminal of claim 1, wherein the plurality of windows further include a third window for displaying an image of the transmitted portion of the content displayed at the second terminal.

5. The first terminal of claim 1, further comprising:
an image compressor configured to compress the extracted portion of the content; and/or
a scaler configured to scale the extracted portion of the content.

6. The first terminal of claim 1, wherein the display displays the extracted portion of the content in a pop-up window.

7. The first terminal of claim 1, wherein the network unit receives, from the second terminal, screen state information for the transmitted extracted portion of the content being displayed on the second terminal, and the display displays the received screen state information.

8. The first terminal of claim 1, wherein a manner in which the plurality of windows are displayed on the display is varied according to a user input.

9. The first terminal of claim 1, wherein the display displays resolution information or size information of the second terminal's display.

10. The first terminal of claim 1, further comprising:
a determining unit configured to determine whether a text is included in the selected portion of the content; and
a text extracting unit configured to extract the text from the selected portion of the content if the determining unit determines that the text is included in the selected portion of the content,
wherein the network unit transmits only the extracted text output from the text extraction unit to the second terminal.

11. The first terminal of claim 10, wherein the display displays a message for asking the user whether or not the extracted text is to be transmitted to the second terminal, prior to transmitting any content to the second terminal.

12. A method for providing a video communication in cooperation with a second terminal, the method comprising:
displaying, by a display of a first terminal, a plurality of windows including first and second windows, the first window configured to display an image of at least one user at the second terminal, the second window configured to display a content and an indicator for selecting content of the first terminal associated with the video communication;
receiving, by the first terminal, a user's selection of a portion of the content displayed on the second window;
extracting, by a region selecting unit of the first terminal, the selected portion of the content displayed on the second window;
scaling, by the first terminal, the extracted portion of the content according resolution information or display size information of second terminal's display; and
transmitting, by the first terminal, the content to the second terminal.

13. The method of claim 12, wherein the content displayed on the second window is an image or text.

14. The method of claim 12, further comprising:
when the content displayed on the second window includes texts, displaying on the display of the first terminal a pop-up window requesting whether or not the texts alone are to be transmitted to the second terminal.

15. The method of claim 12, wherein the plurality of windows further include a third window for displaying an image of the transmitted portion of the content displayed at the second terminal.

16. The method of claim 12, further comprising:
compressing, by the first terminal, the extracted portion of the content; and/or
scaling, by the first terminal, the extracted portion of the content.

17. The method of claim 12, wherein the displaying step displays the extracted portion of the content in a pop-up window.

18. The method of claim 12, further comprising:
receiving, by the first terminal from the second terminal, screen state information for the transmitted extracted portion of the content being displayed on the second terminal; and
displaying, on the display of the first terminal, the received screen state information.

19. The method of claim 12, wherein in the displaying step, a manner in which the plurality of windows are displayed on the display is varied according to a user input.

20. The method of claim 12, further comprising:
displaying, on the display of the first terminal, resolution information or size information of the second terminal's display.

21. The method of claim 12, further comprising:
determining, by the first terminal, whether a text is included in the selected portion of the content; and
extracting, by the first terminal, the text from the selected portion of the content if the determining step determines that the text is included in the selected portion of the content,
wherein the first terminal transmits only the extracted text to the second terminal.

22. The method of claim 21, further comprising:
displaying, on the display of the first terminal, a message for asking the user whether or not the extracted text is to be transmitted to the second terminal, prior to transmitting any content to the second terminal.

* * * * *